(12) United States Patent
Lundberg (10) Patent No.: US 9,756,348 B2
(45) Date of Patent: Sep. 5, 2017

(54) METHOD, DEVICE AND SYSTEM FOR PRODUCING A MERGED DIGITAL VIDEO SEQUENCE

(71) Applicant: AXIS AB, Lund (SE)

(72) Inventor: Stefan Lundberg, Lund (SE)

(73) Assignee: AXIS AB, Lund (SE)

( * ) Notice: Subject to any disclaimer, the term of this patent is extended or adjusted under 35 U.S.C. 154(b) by 233 days.

(21) Appl. No.: 14/316,227

(22) Filed: Jun. 26, 2014

(65) Prior Publication Data

US 2015/0036736 A1    Feb. 5, 2015

(30) Foreign Application Priority Data

Jul. 31, 2013    (EP) .................................. 13178768

(51) Int. Cl.
*H04N 19/132*    (2014.01)
*H04N 19/187*    (2014.01)
(Continued)

(52) U.S. Cl.
CPC ......... *H04N 19/187* (2014.11); *H04N 19/117* (2014.11); *H04N 19/132* (2014.11); *H04N 19/167* (2014.11); *H04N 19/176* (2014.11); *H04N 19/29* (2014.11); *H04N 19/503* (2014.11); *H04N 19/59* (2014.11); *H04N 19/61* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 5,177,608 A * | 1/1993 | Ohki | ........................ G06T 9/40 348/416.1 |
| 5,436,665 A * | 7/1995 | Ueno | ................... H04N 19/105 375/240.14 |

(Continued)

FOREIGN PATENT DOCUMENTS

| | | |
|---|---|---|
| EP | 1315380 A2 | 5/2003 |
| WO | 2007126517 A2 | 11/2007 |

OTHER PUBLICATIONS

Ivan et al., "Integrated H.264 Region-of-Interest Detection, Tracking and Compression for Surveillance Scenes", Proceedings of 2010 IEEE 18th International Packet Video Workshop, Dec. 13-14, 2010.*

*Primary Examiner* — Mohammad J Rahman
(74) *Attorney, Agent, or Firm* — Volpe and Koenig, P.C.

(57) ABSTRACT

A video processing device for producing a frame of a merged digital video sequence. A memory storing a first and a second digital video sequence depicting the same scene. The first digital video sequence has a higher pixel density than the second digital video sequence. A scaler generating an up-scaled version having the same pixel density as the first video sequence. A decoder decoding a frame of the first digital video sequence and a skip block identifying a position for a skip block and a non-skip block in the frame of the first digital video sequence. A block extractor extracting a block of pixels from the frame of the second digital video sequence based on the skip block and a block of pixels from the frame of the first digital video sequence based on the non-skip block. A merging unit merging both extracted blocks to produce the merged video sequence.

18 Claims, 5 Drawing Sheets

(51) Int. Cl.
*H04N 19/503* (2014.01)
*H04N 19/117* (2014.01)
*H04N 19/176* (2014.01)
*H04N 19/70* (2014.01)
*H04N 19/61* (2014.01)
*H04N 19/167* (2014.01)
*H04N 19/29* (2014.01)
*H04N 19/59* (2014.01)

(56) References Cited

U.S. PATENT DOCUMENTS

| | | | | |
|---|---|---|---|---|
| 5,574,762 | A * | 11/1996 | Sato | G06K 9/00778 377/10 |
| 5,854,856 | A * | 12/1998 | Moura | G06T 9/20 348/415.1 |
| 5,886,743 | A * | 3/1999 | Oh | H04N 19/61 375/240.02 |
| 6,421,466 | B1 * | 7/2002 | Lin | H04N 19/186 375/240.11 |
| 6,600,786 | B1 * | 7/2003 | Prakash | H04N 19/52 375/240.08 |
| 6,611,530 | B1 * | 8/2003 | Apostolopoulos | H04N 21/6377 348/443 |
| 6,680,976 | B1 * | 1/2004 | Chen | H04N 21/2383 375/240.12 |
| 6,798,424 | B2 | 9/2004 | Nakamura | H04N 19/23 345/629 |
| 7,099,510 | B2 | 8/2006 | Jones et al. | |
| 7,268,834 | B2 * | 9/2007 | Lundberg | H04N 5/272 348/586 |
| 8,121,424 | B2 | 2/2012 | Almbladh | |
| 8,208,555 | B2 | 6/2012 | Wu | |
| 8,588,299 | B1 * | 11/2013 | Yeo | H04N 19/33 375/240.12 |
| 2004/0109059 | A1 * | 6/2004 | Kawakita | H04N 7/18 348/143 |
| 2004/0218099 | A1 * | 11/2004 | Washington | H04N 5/77 348/571 |
| 2004/0252230 | A1 * | 12/2004 | Winder | G06T 7/2053 348/402.1 |
| 2004/0252759 | A1 * | 12/2004 | John Winder | H04N 5/145 375/240.12 |
| 2005/0122397 | A1 | 6/2005 | Henson et al. | |
| 2005/0213833 | A1 | 9/2005 | Okada et al. | |
| 2006/0126740 | A1 * | 6/2006 | Lin | H04N 19/52 375/240.16 |
| 2007/0222858 | A1 * | 9/2007 | Sugimoto | G06K 9/00362 348/143 |
| 2008/0084927 | A1 * | 4/2008 | Rosenzweig | H04N 21/234363 375/240.02 |
| 2009/0052543 | A1 * | 2/2009 | Wu | H04N 19/00 375/240.24 |
| 2009/0115877 | A1 | 5/2009 | Verdant | |
| 2010/0119156 | A1 | 5/2010 | Noguchi et al. | |
| 2010/0119157 | A1 * | 5/2010 | Kameyama | H04N 19/115 382/195 |
| 2010/0290704 | A1 | 11/2010 | Christiansen | |
| 2011/0096990 | A1 | 4/2011 | Lu et al. | |
| 2011/0268175 | A1 * | 11/2011 | Tan | H04N 19/105 375/240.01 |
| 2011/0310216 | A1 * | 12/2011 | Lee | H04N 7/15 348/14.08 |
| 2012/0114040 | A1 | 5/2012 | Shmueli et al. | |
| 2012/0320979 | A1 * | 12/2012 | Lundberg | H04N 19/105 375/240.13 |
| 2013/0022117 | A1 * | 1/2013 | Lou | H04N 19/96 375/240.16 |
| 2013/0080111 | A1 * | 3/2013 | Dunik | G06T 7/0024 702/152 |
| 2013/0088600 | A1 * | 4/2013 | Wu | G08G 1/054 348/149 |
| 2013/0287092 | A1 * | 10/2013 | Dow | H04N 19/30 375/240.02 |
| 2014/0010282 | A1 * | 1/2014 | He | H04N 21/23439 375/240.02 |
| 2014/0044179 | A1 * | 2/2014 | Li | H04N 19/597 375/240.16 |
| 2014/0063342 | A1 * | 3/2014 | Lundberg | H04N 7/012 348/458 |
| 2014/0071271 | A1 * | 3/2014 | Altmann | H04N 5/268 348/143 |
| 2014/0169474 | A1 * | 6/2014 | Kang | H04N 13/0022 375/240.16 |
| 2015/0026747 | A1 * | 1/2015 | Au | H04N 21/23439 725/116 |
| 2016/0148649 | A1 * | 5/2016 | Rehn | G11B 27/005 386/278 |

\* cited by examiner

METHOD, DEVICE AND SYSTEM FOR PRODUCING A MERGED DIGITAL VIDEO SEQUENCE

CROSS REFERENCE TO RELATED APPLICATION

This application claims the benefit of European Patent Application No. 13178768.1 filed Jul. 31, 2013, which is incorporated by reference as if fully set forth.

FIELD OF INVENTION

The present invention relates to a method, a video processing device and a system for producing a frame of a merged digital video sequence.

BACKGROUND

Monitoring devices especially video recording devices are today widely used for monitoring of different premises, e.g. houses, road strips, metro stations or production plants. By recording a monitoring video sequence, information pertaining to an event, being e.g. a crime, an accident or a production miss failure, may be recapitulated by play back of the monitoring video sequence. One type of a video recording device is a digital monitoring camera being arranged to capture digital video sequences and to send the digital video sequences over a network e.g. the internet. Such a digital monitoring camera is typically set up to operate according to the following. The camera's components, (comprising a lens and an image sensor), capture images, which can be described as light of different wavelengths, and transforms them into electrical signals. These signals are then converted from analog to digital format. Thereafter the digital format signals are being subjected to digital image processing before being sent over the network.

A trend of today is that the cameras are equipped with better and better image sensors having higher and higher image resolution. This results in that the amount of monitoring digital video sequence data to be sent over the network is increasing. Moreover, the amount of monitoring digital video sequence data to be stored is increasing. Hence, the bit rate of the monitoring digital video sequence data is increasing. In order to reduce the bit rate of the monitoring digital video sequence data the monitoring digital video sequence data is typically compressed using video coding techniques such as video coding standards of the ISO/MPEG or ITU-H.26X families.

In modern digital video coding systems, two main modes are used to compress a video frame of a sequence of video frames: the INTRA-mode and the INTER-mode. In the INTRA-mode, the luminance and chrominance channels are encoded by exploiting the spatial redundancy of the pixels in a given channel of a single frame via prediction, transform and entropy coding. The INTER-mode, exploiting the temporal redundancy between separate frames, relies on a motion-compensation prediction technique that predicts parts of a frame from one (or more) previously decoded frame(s) by encoding the motion in pixels from one frame to the other for selected blocks. In INTER mode the luminance and chrominance channels does not have any motion predictions. A motion detection algorithm is typically used to detect motion between two frames when encoding using the INTER mode.

In U.S. Pat. No. 8,208,555, a method for reducing the bit rate of video data even further as compared with only using encoding is disclosed. An image capturing module is used for capturing a scene of an area to be displayed and outputting image data. An image processor converts the image data according to a first and a second cutting areas and a first and a second shrink ratio values, and outputs a first and a second sub-images. The first cutting area includes the second cutting area, and the first shrink ratio value is greater than the second shrink ratio value. An image encoder encodes the first and the second sub-images according to first and second encoding information, and outputs a first and a second digital video sequences. A network transmission module is used for transmitting the first and the second digital video sequences to a receiver. At the receiver the two digital video sequences are decoded and reconstructed into the original image data.

The method according to U.S. Pat. No. 8,208,555 provides reduced bit rate of the image data both during transmission of the image data from the sending device to the receiver and during storing of the image data in the form of the two image streams. However, a drawback with this method of reducing the bit rate is that in order to play back the captured scene comparably large processing power as compared with only decoding a single encoded digital video sequence is needed to both to decode the two digital video sequences and to reconstruct the image data from the decoded two digital video sequences.

Hence, in light of the above there is a need for a method to reduce the bit rate of monitoring digital video sequence data without the need to use comparably large processing power for play back of stored video data.

SUMMARY

In view of the above, an objective of the present invention is to enable reduction of bit rate of a digital video sequence and at the same time provide for checking the reliability of the encoding in the video recordings.

In particular, according to a first aspect of the invention a method for producing a frame of a merged digital video sequence is provided. The method comprises the steps of: providing a frame of a first digital video sequence and a frame of a second digital video sequence, the frames of the first and second digital video sequences depicting the same scene, the frame of the first digital video sequence having a higher pixel density than the frame of the second digital video sequence, wherein at least the frame of the first digital video sequence is encoded using a video compression algorithm; scaling, using a scaler, the frame of the second digital video sequence such that an up-scaled frame of the second digital video sequence having the same pixel density as the frame of the first video sequence is obtained; identifying, while decoding, using a decoder, the encoded frame of the first digital video sequence and using a skip block identifier, a position for at least one skip block and a position for at least one non-skip block in the frame of the first digital video sequence; extracting, using a block extractor and based on the identified position for the at least one skip block in the frame of the first digital video sequence, at least one corresponding block of pixels from the frame of the second digital video sequence; extracting, using the block extractor and based on the identified position for the at least one non-skip block in the frame of the first digital video sequence, at least one corresponding block of pixels from the frame of the first digital video sequence; and merging, using a merging unit, the extracted block of pixels from the frame of the second digital video sequence and the extracted block of pixels from the frame of the first digital video sequence such that the frame of the merged video sequence is produced.

The wording same scene should be construed as the scene in the first stream is the same scene as in the second stream. The frame rate could however differ between the first and second streams. Hence, the first and a second digital video sequences are spatially and temporally similar.

The wording frame should be construed as one of the many still (or nearly so) images which compose the complete video sequence.

The wording pixel should be construed as the smallest addressable element in a digital image.

The wording pixel density should be construed as the number of pixels of an image depicting a specific scene.

The wording block should be construed as a group of pixels. Typical block sizes are 4×4, 8×8 or 16×16 pixels. However, in connection with the present invention also other block sizes may be used.

The wording skip block should be construed as a block coded without sending residual error or motion vectors. The encoder will only record that it is a skip block. The decoder will deduce the motion vector of the skip block from other blocks already decoded.

In the merged digital video sequence it is safeguarded that no information of relevance is missed since the skip blocks of the first digital video sequence is replaced with image information from the second digital video sequence. Moreover, at the same time, high level of detail is maintained for the areas of the scene considered to be of relevance in the merged digital video sequence. This since, the areas of the scene considered to be of relevance is fetched from the first digital video sequence having a high level of detail due to its high resolution. Typically, areas of the scene considered to be of relevance are areas containing motion, a specific type of object, e.g. a face, a car, etc, or other information being considered relevant for the end viewer of the image. Furthermore, the merged digital video sequence is having a relatively low bit rate.

The method may further comprise filtering, using a filter, the scaled frame of the second digital video sequence. By filtering the scaled frame of the second digital video sequence edges from the scaling may be reduced and/or smoothen helping in producing a frame of the merged digital video sequence being better looking.

The frame of the second digital video sequence may be encoded using a video compression algorithm, wherein the method further comprises decoding, using the decoder, the frame of the second digital video sequence. By decoding the second digital video sequence the bit rate of the second digital video sequence may be reduced.

The frame of the first digital video sequence may be an INTER-frame.

The video compression algorithm may be ITU-H.26X, ISO-MPEG, WMV, On2 or WebM compliant.

The method may further comprise storing the frame of the merged digital video sequence in a memory. By storing the merged digital video sequence in a memory the merged digital video sequence may be later used for analysis, viewing, etc.

The method may further comprise play back of the frame of the merged video sequence.

According to a second aspect of the invention a computer-readable recording medium having recorded thereon a program for implementing the above method when executed on a device having processing capabilities is provided.

The above mentioned features, when applicable, applies to this second aspect as well. In order to avoid undue repetition, reference is made to the above.

According to a third aspect of the invention a video processing device arranged to execute the program recorded on the above computer-readable recording is provided.

According to a fourth aspect of the invention a video processing device for producing a frame of a merged digital video sequence is provided. The video processing device comprises: a memory arranged to store a first and a second digital video sequence depicting the same scene, the first digital video sequence having a higher pixel density than the second digital video sequence, wherein at least the first digital video sequence is encoded using a video compression algorithm; a scaler arranged to scale the second digital video sequence such that an up-scaled version of the second digital video sequence having the same pixel density as the first video sequence is obtained; a decoder arranged to decode a frame of the first digital video sequence; a skip block identifier arranged to, while decoding, using the decoder, the encoded frame of the first digital video sequence, identify a position for at least one skip block and a position for at least one non-skip block in the frame of the first digital video sequence; a block extractor arranged to extract based on the identified position for the at least one skip block in the frame of the first digital video sequence, at least one corresponding block of pixels from the frame of the second digital video sequence and based on the identified position for the at least one non-skip block in the frame of the first digital video sequence, at least one corresponding block of pixels from the frame of the first digital video sequence; and a merging unit arranged to merge the extracted block of pixels from the frame of the second digital video sequence and the extracted block of pixels from the frame of the first digital video sequence such that the frame of the merged video sequence is produced.

The above mentioned features, when applicable, apply to this fourth aspect as well. In order to avoid undue repetition, reference is made to the above.

Moreover, the video processing device may further comprise an analysis unit arranged to analyze frames of the first digital video sequence to identify pixel blocks considered to be of relevance.

The video processing device may further comprise a mask generator arranged to output a mask indicating pixel blocks of relevance in the frames of the first digital video sequence.

The video processing device may further comprise an encoding unit arranged to encode the frames of the first digital video sequence using the mask indicating pixel blocks of relevance into frames in an encoded version of the first video sequence, wherein the pixel blocks being masked out as not being of relevance are encoded using skip blocks.

The video processing device may further comprise an image sensor arranged to capture a video sequence of a scene; and an image processor arranged to process the video sequence of the scene captured by the image sensor into the first and the second digital video sequence depicting the same scene.

According to a fifth aspect of the invention a system for producing a frame of a merged digital video sequence is provided. The system comprises: a digital network camera comprising: an image sensor arranged to capture a video sequence of a scene; an image processor arranged to process the video sequence of the scene captured by the image sensor into a first and a second digital video sequence depicting the same scene, the first digital video sequence having a higher pixel density than the second digital video sequence; an analysis unit arranged to analyze frames of the first digital video sequence to identify pixel blocks considered to be of relevance; a mask generator arranged to output a mask indicating pixel blocks of relevance in the frames of the first digital video sequence; an encoding unit arranged to encode the frames of the first digital video sequence using the mask indicating pixel blocks of relevance into frames in an encoded version of the first video sequence, wherein the pixel blocks being masked out as not being of relevance are encoded using skip blocks; and an Ethernet interface arranged to transmit the second digital video sequence and the encoded first digital video sequence over a digital network; and a video processing device, comprising: an Ethernet interface arranged to receive the second digital video sequence and the encoded first digital video sequence from the digital network; a scaler arranged to scale the second digital video sequence such that an up-scaled version of the second digital video sequence having the same pixel density as the first video sequence is obtained; a decoder arranged to decode a frame of the first digital video sequence; a skip block identifier arranged to, while decoding, using the decoder, the encoded frame of the first digital video sequence, identify a position for at least one skip block and a position for at least one non-skip block in the frame of the first digital video sequence; a block extractor arranged to extract based on the identified position for the at least one skip block in the frame of the first digital video sequence, at least one corresponding block of pixels from the frame of the second digital video sequence and based on the identified position for the at least one non-skip block in the frame of the first digital video sequence, at least one corresponding block of pixels from the frame of the first digital video sequence; and a merging unit arranged to merge the extracted block of pixels from the frame of the second digital video sequence and the extracted block of pixels from the frame of the first digital video sequence such that the frame of the merged video sequence is produced.

The above mentioned features, when applicable, apply to this fifth aspect as well. In order to avoid undue repetition, reference is made to the above.

It is noted that the invention relates to all possible combinations of features recited in the claims.

BRIEF DESCRIPTION OF THE DRAWINGS

These and other aspects of the present invention will now be described in more detail, with reference to appended drawings showing embodiments of the invention. The figures should not be considered limiting the invention to the specific embodiment; instead they are used for explaining and understanding the invention.

DETAILED DESCRIPTION OF THE PREFERRED EMBODIMENTS

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the video coding standards of the ISO/MPEG family (MPEG-1, MPEG-2, MPEG-4) and to the video recommendations of the ITU-H.26X family (H.261, H.263 and extensions, H.264 and HEVC, the upcoming h.265 standard). However, the same techniques can easily be applied to other types of video coding standards, e.g. Microsoft codecs belonging to the WMV-family, On2 codecs (e.g. VP6, VP6-E, VP6-S, VP7 or VP8) or WebM.

Usually, a frame to be encoded is partitioned into minimum coding units (block, macro blocks etc) which is being compressed and encoded individually. In INTER mode each of the blocks are assigned one or several motion vectors. A prediction of the frame is constructed by displacing pixel blocks from past and/or future frame(s) according to the set of motion vectors. Finally, the difference, called the residual signal, between the frame to be encoded and its motion-compensated prediction is entropy encoded in a similar way to the INTRA-mode by transform coding.

Moreover, in INTER-mode skip blocks may be used. A skip block is coded without sending residual error or motion vectors. The encoder will only record that it is a skip block. The decoder will deduce the image information of a skip block from other blocks already decoded. According to this invention the image information of a skip block is preferably deduced from a block of the same frame or a block in a preceding frame of the digital video data.

Video frames being encoded according to the INTRA-mode, without any reference to any past or future frame, are called I-frames. Video frames being encoded according to the INTER-mode are themselves either mono-directionally predicted frames, called P-frames and encoded with reference to a past or future frame which is an INTRA- or INTER-frame, or bi-directionally predicted frames, called B-frames and encoded with reference to two or more past or future reference frames. Both P-frames and B frames may include I-blocks which encodes new data not found anywhere in earlier frames, but usually they are rare.

INTRA-frames comprise either scene change frames, placed at the beginning of a new group of frames corresponding to a scene change, where no temporal redundancy is available, or refresh frames, placed in other locations where some temporal redundancy is available. I-frames are usually inserted at regular or irregular interval to have refresh-point for new stream encoders or as a recovery point for transmission errors.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The present invention addresses the problem of reducing the bit rate of monitoring video data captured by a monitoring device such as a networked digital video camera and at the same time provide for checking the reliability of the encoding in the video recordings. This is achieved by merging a first and a second digital video sequence depicting the same scene into a merged digital video sequence as will be discussed in more detail below.

Figure 1:
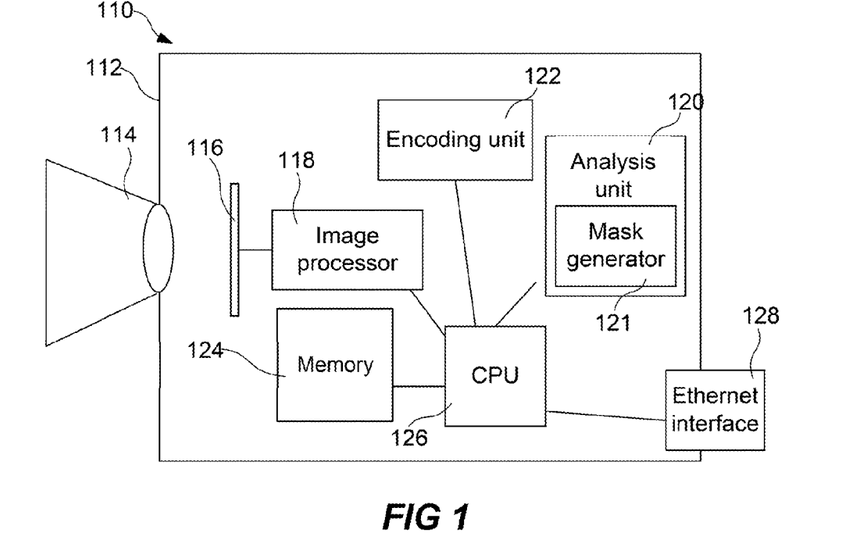
FIG. 1 is a schematic view of a digital network camera arranged to provide the first and the second digital video sequences depicting the same scene.

FIG. 1 illustrates a digital network camera 110 arranged to provide the first and the second digital video sequences depicting the same scene. The digital network camera 110 is arranged to capture and process (and possibly also store) video data. The digital network camera 110 comprises a housing 112, a lens 114, an image sensor 116, an image processing unit 118, an analysis unit 120 comprising a mask generator 121, an encoding unit 122, a memory 124, a CPU 126 and an Ethernet interface 128. Any one of the image processing unit 118, the analysis unit 120 and/or encoding unit 122 may be implemented as hardware and/or software.

The digital network camera 110 is arranged to be connected to a digital network such as the Internet or a Local Area Network (LAN) via the Ethernet interface 128. The connection to the digital network may be wired or wireless. Thus, the Ethernet interface 128 may be a network port adapted to 10/100/1000 Mbps data traffic, such as an Ethernet port, a modular port being arranged to receive a modular connector, e.g. a RJ45 connector. Normally such a RJ45 connector port is arranged to receive a network cable, such as a twisted pair cable (e.g. of cat 5, cat 5e or cat 6). Alternatively the I/O means of the network port may be a wireless I/O means using mobile internet communication standards (i.e. 1G, 2G, 2.5G, 2.75G, 3G, 3.5G, 3.75G, 3.9G, 4G) or using WiFi.

The camera components, i.e. the lens 114 and the image sensor 116, of the digital network camera 110 is arranged to capture raw images wherein each raw image can be described as light of different wavelengths and originating from different objects and parts of objects. These raw imaged are then converted from analog to digital format and transferred into the image processing unit 118.

The image processing unit 118 is arranged to process the same raw images into at least two digital video sequences.

Alternatively, the camera may comprise two sets of separate lenses and image sensors (not shown), wherein each set is arranged to generate separate raw images monitoring the same scene. The separate raw images are further processed by the image processing unit into at least two digital video sequences.

According to a further alternative, the camera may comprise one lens, a beam splitter and two image sensors (not shown), wherein the beam splitter is arranged to separately image the same scene on two different image sensors generating separate raw images. The separate raw images are further processed by the image processing unit into at least two digital video sequences.

According to yet a further alternative, the camera comprises two image processing units (not shown). A first image processing unit is arranged to provide a first digital video sequence and a second image processing unit is arranged to provide a second digital video sequence.

Hence, the image processing unit 118 is arranged to provide a first and a second digital video sequence depicting the same scene, i.e. the first and the second digital video sequences are spatially and temporally similar. The first and second video sequence may have different frame rates. A time stamp or a frame number is used to synchronize two video sequences having different frame rates. For example the frame of one of the video sequences is a fraction of the frame rate of another of the video sequences, e.g. having the ratio 1:2. The second digital video sequence is recorded in parallel with the first digital video sequence. The image processing unit 118 is arranged to produce the first digital video sequence having a higher pixel density than the second digital video sequence. The bit rate of the second digital video sequence is hence much lower than the bit rate of the first digital video sequence. According to one embodiment of the present invention the image processing unit 118 is arranged to provide the first digital video sequence having substantially the same pixel density as the image sensor 116 and the second digital video sequence having a pixel density being a fraction of the pixel density of the image sensor 116. For example the pixel density of the second digital video sequence may be divided by four in each direction. In other words, the image sensor 116 is arranged to capture raw images and the image processing unit 118 is arranged to process the raw images to obtain two corresponding image sequences; a first image sequence with a first pixel density and a second image sequence with a second pixel density, the first digital video sequence having a higher pixel density than the second digital video sequence.

The analysis unit 120 is arranged to analyze frames of the first digital video sequence to identify pixel blocks considered to be of relevance. Typically, pixel blocks considered to be of relevance are pixel blocks contain motion, a specific type of object, e.g. a face, a car, etc, or other information being considered relevant for the end viewer of the image. The analysis unit 120 further comprises a mask generator 121 being arranged to output a mask, e.g. a binary mask, indicating pixel blocks of relevance. It should be noted that the mask may be different for different images of the first digital video sequence. In a different embodiment the analysis unit may also use information from the second digital video sequence to analyze the image using a pyramid based algorithm where a low resolution version is used to speed up the analysis algorithm.

The encoding unit 122 is arranged to encode digital video sequences using video coding techniques such as video coding standards of the ISO/MPEG or ITU-H.26X families.

The encoding unit 122 is arranged to encode the frames of the first digital video sequence using the mask indicating pixel blocks of relevance into frames in an encoded version of the first video sequence. The pixel blocks being masked out as not being of relevance are encoded using skip blocks.

In order to reduce the bit rate for the first digital video sequence, while keeping the high pixel density, skip blocks are used more frequently than during normal encoding. The skip blocks are used to avoid encoding parts of the image not being of relevance. Example of parts usually not considered to be of relevance are parts of the image not containing motion and/or parts of the image belonging to the background, the background typically being the static part of the scene. Accordingly, the first digital video sequence is achieved by processing the images in the original digital video sequence using different filters and algorithms to find what is of relevance for the user and hence should be encoded in the first video sequence. The different filters or algorithms are all based on detecting motion but is of different complexity. The user may configure what is considered to be relevant in the scene. Hence, the encoding unit 122 is arranged to be set in different encoding modes depending on the filter or algorithm used and/or on settings made by the user. For example the encoding unit 122 may be set such that faces but not cats are encoded in the first video sequence. Hence, the use of skip block is controlled by a video motion detection algorithm and/or a filter. The video motion detection algorithm is preferably based on spatio-temporal video analysis. Some examples of video motion detection algorithms and filters possible to use are:

An algorithm based on "change detection". According to this algorithm an image is compared with a previous image pixel-by-pixel in order to find pixels changing between the image and the previous image.

An algorithm based on "motion detection". According to this algorithm an image is compared with a previous image filtering out "real" motion from for example illumination changes. This can for example be performed by applying spatio-temporal video analysis; Almbladh is for example describing a method for spatio-temporal video analysis in U.S. Pat. No. 8,121,424.

An algorithm based on "object motion detection" and "object classification". According to this algorithm the detected motion is analyzed to detect moving objects which are tracked so that objects that have been in motion but are temporarily standing still is detected. Hence, according to this algorithm the objects may e.g. be analyzed and classified as for example "human", "vehicle", "car", "animal", "face" etc. In order to classify objects the method of Viola and Jones described in U.S. Pat. No. 7,099,510 may be used.

The different filters and algorithms mentioned above typically build on each other to step-wise achieve a higher degree of complexity.

Preferably the video motion detection algorithm used is arranged to separate true motion from light changes as well as global changes due to camera vibrations, atmospheric movement due to for example heat and swaying tree leaves, bushes etc. However, by setting the video motion detection algorithm to only detect motion above a certain level it is most likely that areas within the scene with motion below the set level of motion will not be updated and freezes in the first digital video sequence. Accordingly, areas not recognized as areas with true motion, being an example of areas not of relevance, are updated with a lower refresh rate (skip blocks are frequently used for coding the blocks of these areas) than areas recognized as areas with true motion. Areas recognized as areas with true motion are encoded without using skip blocks (hence at full frame rate and quality). At certain intervals normal I-frames are inserted to ease later video search and/or to update the background model of the scene that may be used for segmenting the image in a background, typically the static part of the scene, and a foreground depicting the motion in the scene. Adaptive I-frames may also be inserted when new motion is detected e.g. new moving objects enters the scene.

The encoding unit 122 is further arranged to encode the second digital video sequence into an encoded version of the second video sequence. The second digital video sequence is preferably encoded without using the mask for identifying areas of relevance, i.e. without using more skip blocks than normal. Alternatively, the analysis unit 120 is arranged to analyze images of the second digital video sequence to identify pixel blocks considered to be of relevance and to output a mask, e.g. a binary mask, indicating pixel blocks of relevance. However, if so, a considerable higher threshold for what is not considered to be relevant for the user and hence encoded with a skip block is used when analyzing the images of the second digital video sequence. For example if object motion detection and object classification is applied to the first video sequence, instead a basic change detection may be applied on the second digital video sequence (but no filtering for global changes etc). By not using skip blocks, or at least a higher threshold for skip blocks than the first video sequence, when encoding the second digital video sequence it is safeguarded that no areas of relevance in the second digital video sequence is missed. The second stream may be encoded with different quality settings (quantization value) or bitrate target than the first video stream.

The encoded version of the first digital video sequence and the encoded version of the second digital video sequence may be directly transmitted over a digital network via the Ethernet interface 128. Alternatively, the encoded version of the first digital video sequence and the encoded version of the second digital video sequence may be stored in the memory 124 for later transmission, via the Ethernet interface 128 and over the digital network, of the encoded versions of the first and second video sequences. The memory 124 may be any kind of volatile or non-volatile memory. Further, the memory 124 may comprise a plurality of memory members. At least one of the plurality of memory members may be used as a buffer memory.

Figure 2:
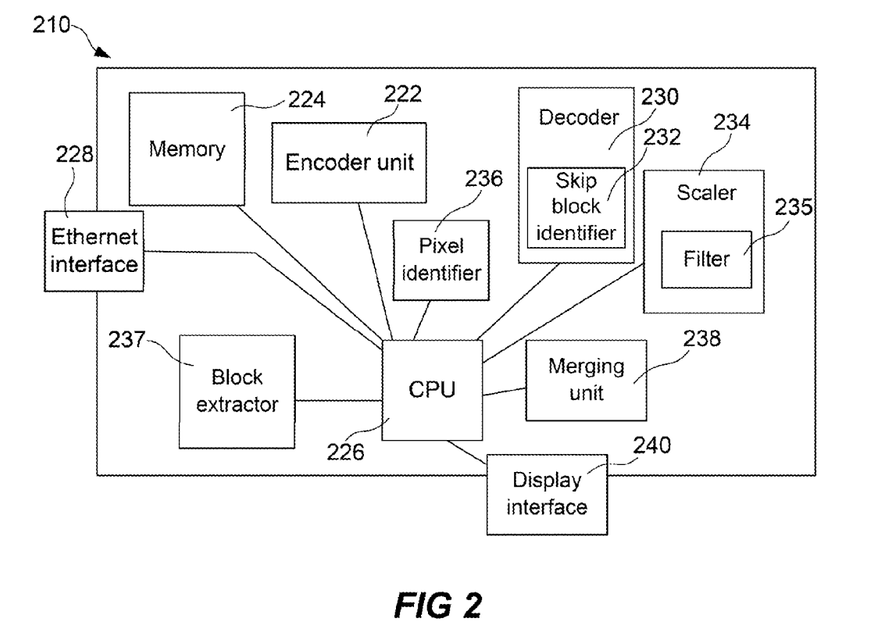
FIG. 2 is a schematic view of a client arranged to merge the first and the second digital video sequences captured by the camera illustrated in FIG. 1 into a merged digital video sequence according to the present invention.

In FIG. 2 a client 210 arranged to receive and merge the encoded versions of the first and second video sequences is illustrated. The client may e.g. be a video management server The client 210 comprises an encoder unit 222, a memory 224 a CPU 226, an Ethernet interface 228, a decoder 230 comprising a skip block identifier 232, a scaler 234 comprising a filter 235, a pixel identifier 236, a block extractor 237, a merging unit 238 and a display interface 240. Any one of the encoder unit 222, the decoder 230 comprising the skip block identifier 232, the scaler 234 comprising the filter 235, the pixel identifier 236, the block extractor 237, and/or the merging unit 238 may be implemented as hardware and/or software.

The pixel identifier 236, the block extractor 237 and merging unit 238 could together be implemented as a multiplexer. In that case the resolution of the images in the two video sequences and the mask need to be identical. Typically the mask has a lower resolution than the video sequences (since it is dealing with blocks of pixels). A scaler could be used to scale the video sequences as well as the mask, so that a multiplexer could be used for this.

An alternative is to implement the pixel identifier 236, the block extractor 237 and merging unit 238 as separate units and in that case the merging unit 238 could be implemented as a multiplexer.

The memory 224 of the client 210 is comparable with the memory 224 of the digital video camera 110; hence in order to avoid undue repetition reference is made to the description above.

The encoded versions of the first and second digital video sequences depicting the same scene are received via the Ethernet interface 228. The Ethernet interface 228 of the client 210 is comparable with the Ethernet interface 128 of the digital video camera 110, hence in order to avoid undue repetition reference is made to the description above.

The decoder 230 is arranged to decode the encoded versions of the first and second digital video sequences.

While decoding the frames of the encoded version of the first digital video sequence the skip block identifier 232 is arranged to identify the skip blocks of the frames of the encoded version of the first digital video sequence. By identifying the skip blocks of a frame in the first digital video sequence a mask, e.g. binary mask, identifying the areas of relevance in the frame of the first digital video sequence may be generated. The areas of relevance being the areas not containing skip blocks.

The scaler 234 is arranged to upscale the frames of the decoded second digital video sequence in order to obtain up-scaled frames of the second digital video sequence having the same pixel density as the frames of the first video sequence. The scaler 234 is arranged to up-scale the whole frames of the second digital video sequence to fit frames of the first video sequence. New pixel values of the frames of the second digital video sequence are typically calculated by interpolating known pixel values. The interpolation may be performed with varying complexity, a simple method being to apply linear interpolation.

The filter 235 is arranged to filter the up-scaled frames of the second digital video sequence to remove up-scaling artifacts. The filter is applied to the whole up-scaled image. The filter is typically used to smoothen edges from the up-scaling, by applying a mixture of edge detection, blurring and sharpening algorithms known in the art.

The pixel identifier 236 is arranged to analyze the mask of a frame in the first digital video sequence to identify a position of a block of pixels not considered to be of relevance. The pixel identifier 236 is further arranged to identify a block of pixels in an up-scaled, filtered and in time corresponding frame of the second digital video sequence, wherein the identified block of pixels in the up-scaled, filtered and in time corresponding frame of the second digital video sequence corresponds to the block of pixels not considered to be of relevance identified in the frame of the first digital video sequence. Hence, the, in the frame of the first video sequence, identified position of the block of pixels not considered to be of relevance is used to extract corresponding block of pixels from the filtered, up-scaled and in time corresponding frame of the second video sequence. The extraction of the block of pixels from the second digital video sequence is performed by the block extractor 237.

The pixel identifier 236 is further arranged to analyze the mask of a frame in the first digital video sequence to identify a position of a block of pixels considered to be of relevance. Hence, the, in the frame of the first video sequence, identified position of the block of pixels considered to be of relevance is used to extract corresponding block of pixels from the first video sequence. The extraction of the block of pixels from the first digital video sequence is performed by the block extractor 237.

The merging unit 238 is further arranged to merge the extracted block of pixels from the first digital video sequence with the extracted block of pixels from the filtered, up-scaled and in time corresponding frame of the second digital video sequence to obtain a merged frame of a merged video sequence. As mentioned above the merging unit 238 may be implemented as a multiplexer. A frame from the first and an up-scaled, filtered and in time corresponding frame from the second digital video sequence as well as the mask identifying the skip blocks of the frame of the first digital video sequence as a control signal controlling which part of image frames to merge is used as input to the multiplexer.

After the merging a second filter (not shown) may be applied to further smoothen edges around the images sections that have been merged.

The merged digital video sequence may also be encoded by means of the encoder unit 222.

The merged digital video sequence may be transmitted to a display using the display interface 240. The display interface 240 may e.g. be a HDMI interface. Alternatively, the merged digital video sequence may be transmitted over the digital network via the Ethernet interface 228. Further alternatively, the merged digital video sequence may be stored in the memory 224 for later transmission to the display using the display interface 240 or for later transmission over the digital network via the Ethernet interface 228.

In the merged digital video sequence it is safeguarded that no information regarding areas of relevance is missed since the skip blocks of the first digital video sequence is replaced with image information from the second digital video sequence. Furthermore, the merged digital video sequence is having a relatively low bit rate if encoded with a video encoder.

Figure 3:
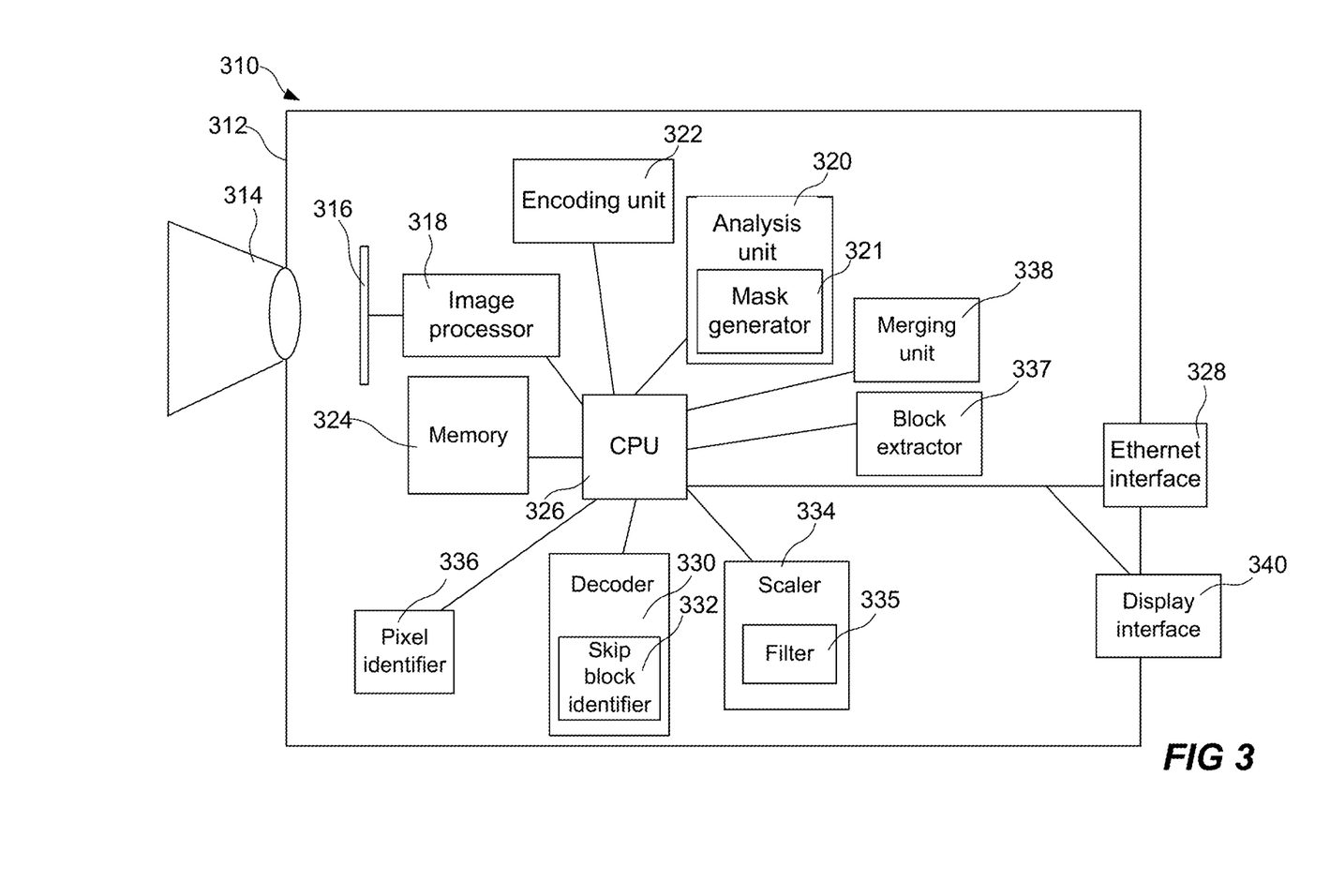
FIG. 3 is a schematic view of a digital network camera arranged to both provide the first and the second digital video sequences depicting the same scene and to merge them into a merged digital video sequence according to the present invention.

FIG. 3 illustrates a digital network camera 310 arranged to both provide the first and the second digital video sequences depicting the same scene and to merge them into a merged digital video sequence. The digital network camera 310 is arranged to capture and process (and possibly also store) video data. The digital network camera 310 comprises a housing 312, a lens 314, an image sensor 316, an image processing unit 318, an analysis unit 320 comprising a mask generator 321, an encoding unit 322, a memory 324, a CPU 326, an Ethernet interface 328, a decoder 330 comprising a skip block identifier 332, a scaler 334 comprising a filter 335, a pixel identifier 336, a block extractor 337, a merging unit 338 and a display interface 340. Any one of the image processing unit 318, the analysis unit 320, the encoding unit 322, the decoder 330 comprising the skip block identifier 332, the scaler 334 comprising the filter 335, the pixel identifier 336, the block extractor 337 and/or the merging unit 338 may be implemented as hardware and/or software.

The operation of the components of the digital network camera 310 is very similar to the operation of the corresponding components of the digital network camera 110 and the client 210 presented above, hence in order to avoid undue repetition reference is made to the description above. According to one embodiment of the digital network camera 310, the digital network camera 310 is arranged to operate according to the following:

The image sensor 316 captures raw images:

The image processing unit 318 is arranged to process the raw images to obtain two corresponding image sequences; a first image sequence with a first pixel density and a second image sequence with a second pixel density, the first digital video sequence having a higher pixel density than the second digital video sequence;

The analysis unit 320 analyzes the images of the first digital video sequence to identify pixel blocks considered to be of relevance and outputs using the mask generator 321 a mask, e.g. a binary mask, indicating pixel blocks of relevance;

The encoding unit 322 is arranged to encode the images of the first digital video sequence using the mask indicating pixel blocks of relevance into frames in an encoded version of the first video sequence. The pixel blocks being masked out as not being of relevance are encoded using skip blocks;

The encoding unit 322 is further arranged to encode the second digital video sequence into an encoded version of the second video sequence;

The encoded version of the first digital video sequence and the encoded version of the second digital video sequence are stored on the memory 324;

The decoder 330 decodes the encoded versions of the first and second digital video sequences;

While decoding the frames of the encoded version of the first digital video sequence the skip block identifier 332 identifies the skip blocks of the frames of the encoded version of the first digital video sequence. By identifying the skip blocks of a frame in the first digital video sequence a mask, e.g. binary mask, identifying the areas of relevance in the frame of the first digital video sequence is generated. The areas of relevance being the areas not containing skip blocks;

The scaler 334 upscale the frames of the decoded second digital video sequence in order to obtain up-scaled frames of the second digital video sequence having the same pixel density as the frames of the first video sequence;

The filter 335 filters the up-scaled frames of the second video sequence to remove up-scaling artifacts;

The pixel identifier 336 analyzes the mask of a frame in the first digital video sequence to identify a position of a block of pixels not considered to be of relevance;

The block extractor 337 uses the identified position of the block of pixels not considered to be of relevance to extract corresponding block of pixels from a filtered, up-scaled and in time corresponding frame of the second digital video sequence;

The pixel identifier 336 analyzes the mask of the frame in the first digital video sequence to identify a position of a block of pixels considered to be of relevance;

The block extractor 337 uses the identified position of the block of pixels considered to be of relevance to extract corresponding block of pixels from the frame in the first digital video sequence;

The merging unit 338 further merges the extracted block of pixels from the frame in the first digital video sequence with the extracted block of pixels from the filtered, up-scaled and in time corresponding frame of the second digital video sequence to obtain a merged frame;

Subsequent raw frames of the first and second digital video sequences are processed in a similar manner as above for producing subsequent merged frames for producing a merged digital video sequence;

The merged digital video sequence may be transmitted to a display using the display interface 340. Alternatively, the merged digital video sequence may be encoded by the encoding unit 322 and thereafter transmitted over the digital network via the Ethernet interface 328 or stored in the memory 324 for later use.

Figure 4:
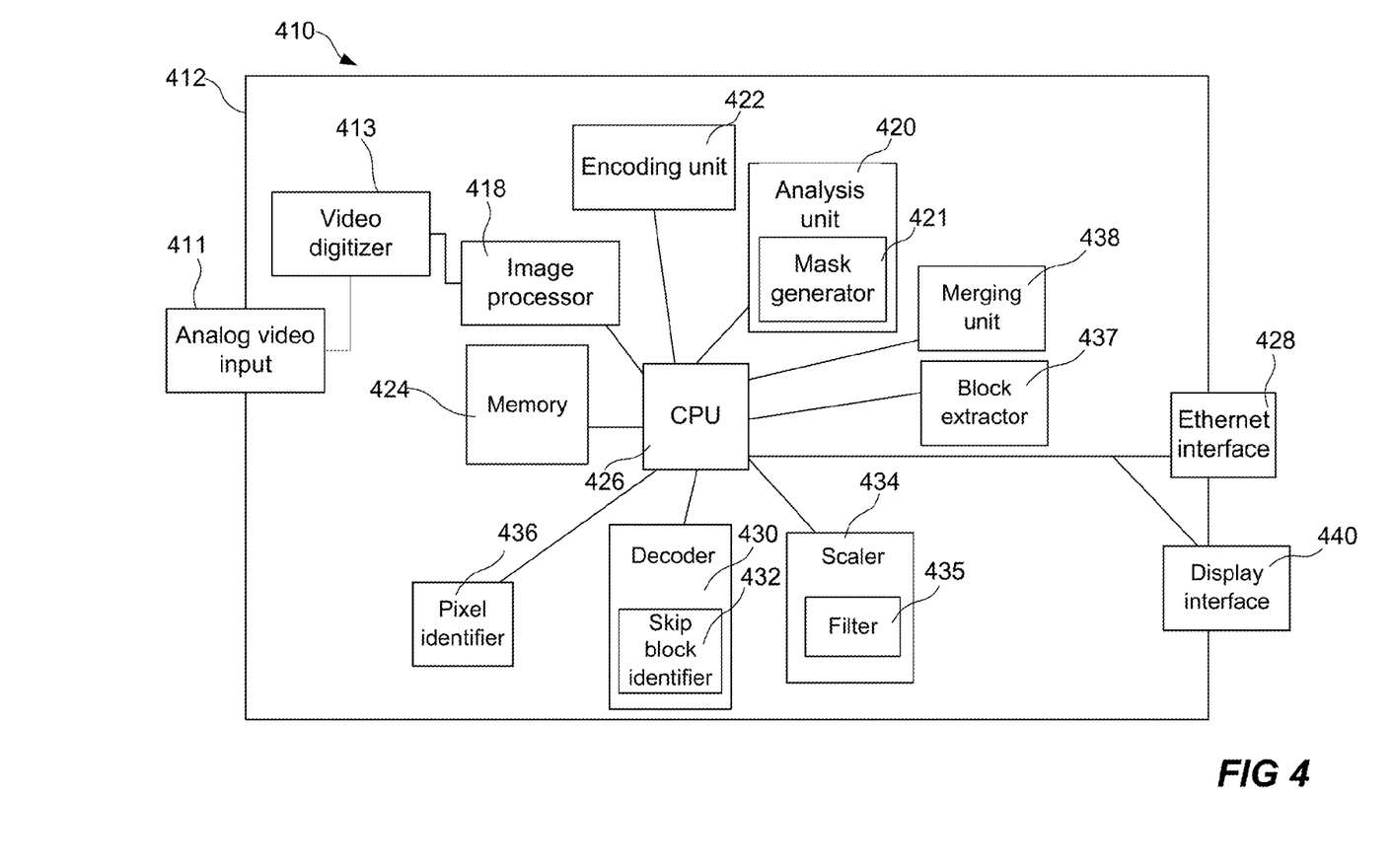
FIG. 4 is a schematic view of video encoder device arranged to both provide the first and the second digital video sequences depicting the same scene and to merge them into a merged digital video sequence according to the present invention.

The client 210, the digital network camera 310 are examples of a video processing device for producing a frame of a merged digital video sequence according to the present invention. Another example of a video processing device for producing a frame of a merged digital video sequence according to the present invention is a video encoder device 410 as illustrated in FIG. 4. The video encoder device 410 comprises an analog video input 411, a housing 412, a video digitizer 413, an image processor 418, an analysis unit 420 comprising a mask generator 421, an encoding unit 422, a memory 424, a CPU 426, an Ethernet interface 428, a decoder 430 comprising a skip block identifier 432, a scaler 434 comprising a filter 435, a pixel identifier 436, a block extractor 437, a merging unit 438 and a display interface 440. Any one of the video digitizer 413, the image processor 418, the analysis unit 420, the encoding unit 422, the decoder 430 comprising the skip block identifier 432, the scaler 434 comprising the filter 435, the pixel identifier 436, the block extractor 437 and/or the merging unit 438 may be implemented as hardware and/or software.

The operation of the components of video encoder device 410 is very similar to the operation of the corresponding components of the digital network camera 310 presented above; hence in order to avoid undue repetition reference is made to the description above.

The analog video input 411 is arranged to receive a analog video sequence from an analog video recording device (not shown).

The video digitizer 413 is arranged to digitize the analog video sequence into a digital video sequence, such digitizers are well known to a person skilled in the art.

The operation of the video encoder device 410 is very similar to the operation of the digital network camera 310 presented above; hence in order to avoid undue repetition reference is made to the description above.

Figure 5:
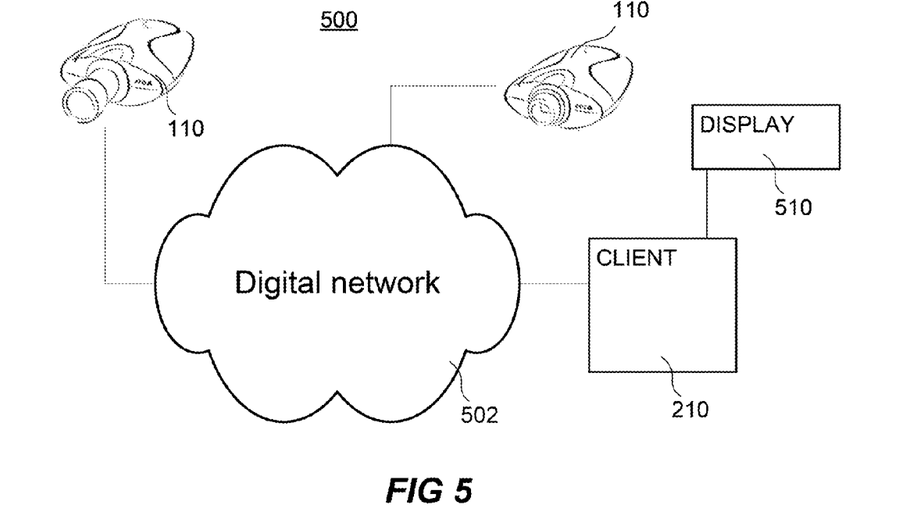
FIG. 5 is a schematic view of a system for producing a merged digital video sequence according to the present invention.

In FIG. 5 a system 500 for producing a frame of a merged digital video sequence according to the present invention is illustrated. The system 500 comprises at least one digital network camera 110 arranged to produce the first and second digital video sequences depicting the same scene and a client 210 arranged to merge the first and second digital video sequences into a merged digital video sequence. The digital network camera 110 is operating as the digital network camera 110 described above. The client 210 is operating as the client 210 described above. The at least one digital network camera 110 and the client 210 are interconnected via a digital network 502. Hence, the system 500 may comprise a plurality of digital network cameras 110. The client 210 is further, via the display interface, connected to display 510 to which decoded versions of the first, the second and/or the merged digital video sequence can be sent for display.

Figure 6:
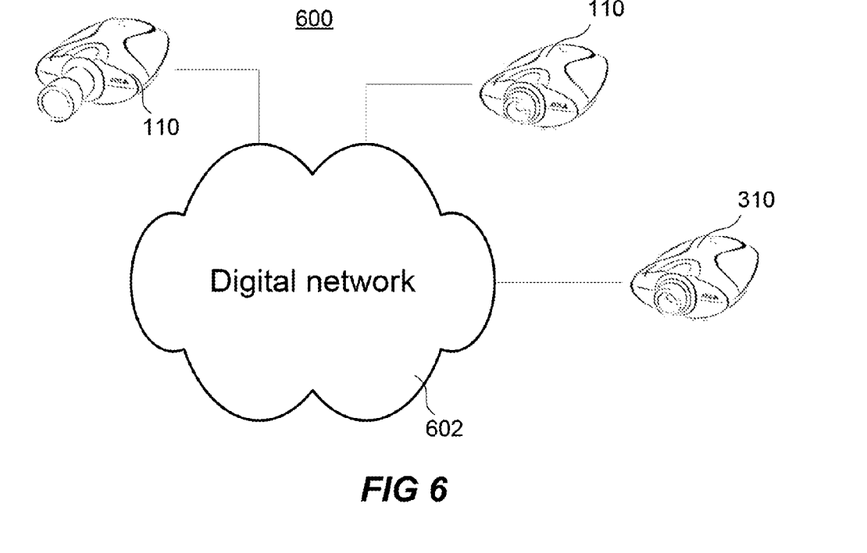
FIG. 6 is a schematic view of an alternative system for producing a merged digital video sequence according to the present invention.

In FIG. 6 an alternative system 600 for producing a frame of a merged digital video sequence according to the present invention is illustrated. The system 600 comprises at least one digital network camera 110 arranged to produce the first and second digital video sequences depicting the same scene and a digital network camera 310 arranged to merge the first and second digital video sequences into a merged digital video sequence. The digital network camera 110 is operating as the digital network camera 110 described above. The digital network camera 310 is operating as the digital network camera 310 described above. The at least one digital network camera 110 and the digital network camera 310 are interconnected via a digital network 602.

Figure 7:
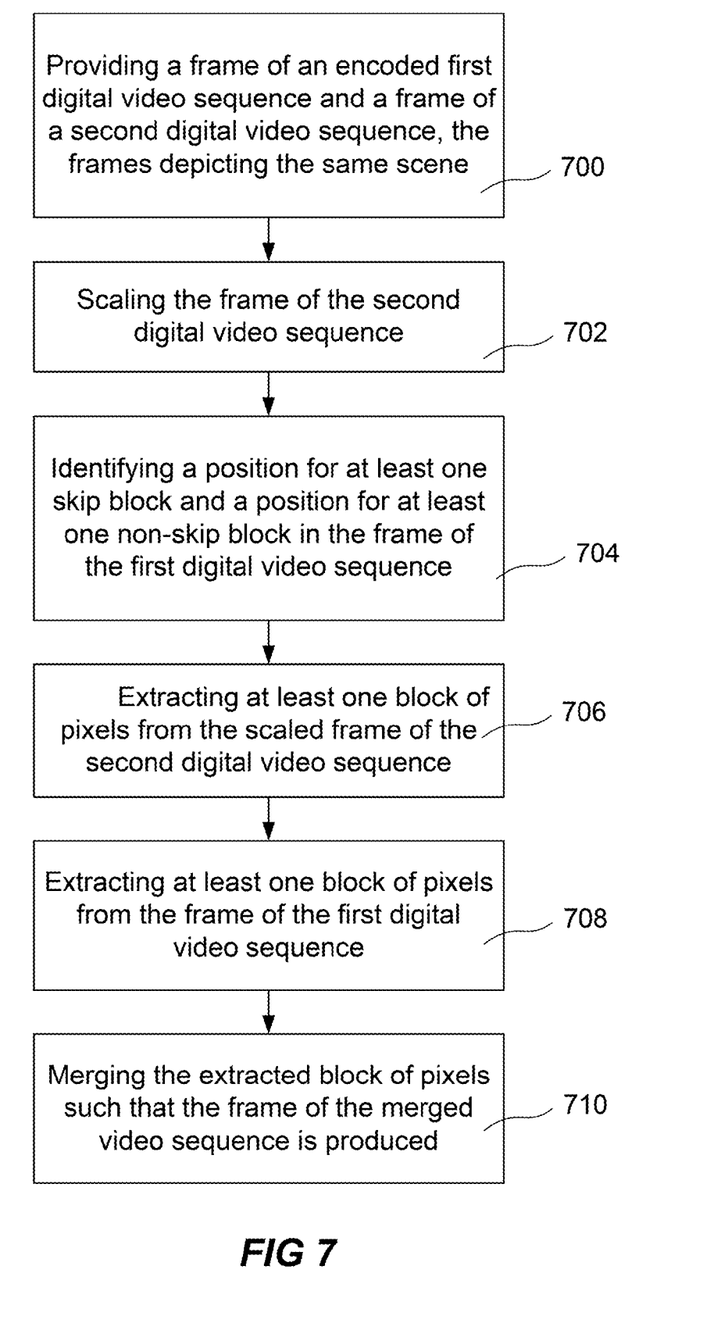
FIG. 7 is a block diagram of an embodiment of a method for producing a merged digital video sequence according to the present invention.

FIG. 7 illustrates an embodiment of a method for producing a frame of a merged digital video sequence according to the present invention. The method comprises:

Providing 700 a frame of a first digital video sequence and a frame of a second digital video sequence, the frames of the first and second digital video sequences depicting the same scene, the frame of the first digital video sequence having a higher pixel density than the frame of the second digital video sequence, wherein at least the frame of the first digital video sequence is encoded using a video compression algorithm;

Scaling 702 the frame of the second digital video sequence such that an up-scaled frame of the second digital video sequence having the same pixel density as the frame of the first video sequence is obtained;

Identifying 704, while decoding the encoded frame of the first digital video sequence, a position for at least one skip block and a position for at least one non-skip block in the frame of the first digital video sequence;

Extracting 706, based on the identified position for the at least one skip block in the frame of the first digital video sequence, at least one corresponding block of pixels from the frame of the second digital video sequence;

Extracting 708, based on the identified position for the at least one non-skip block in the frame of the first digital video sequence, at least one corresponding block of pixels from the frame of the first digital video sequence; and Merging 710 the extracted block of pixels from the frame of the second digital video sequence and the extracted block of pixels from the frame of the first digital video sequence such that the frame of the merged video sequence is produced.

The person skilled in the art realizes that the present invention by no means is limited to the preferred embodiments described above. On the contrary, many modifications and variations are possible within the scope of the appended claims.

For example, it is realized that the storing unit used for storing the merged digital video sequence may be located remote from the video processing device.

Moreover, it is realized that the present invention is not limited to be used with two digital video sequences: Accordingly, any number of digital video sequences may be merged in accordance with the present invention. Although, the present invention as described above is discussed in connection with monitoring video data the method of merging two digital video sequence depicting the same scene may be applied for other kinds of implementations of video data. Accordingly additionally, variations to the disclosed embodiments can be understood and effected by the skilled person in practicing the claimed invention, from a study of the drawings, the disclosure, and the appended claims. Moreover, in the drawings and specification, there have been disclosed preferred embodiments and examples of the invention and, although specific terms are employed, they are used in a generic and descriptive sense only and not for the purpose of limitation, the scope of the invention being set forth in the following claims. In the claims, the word "comprising" does not exclude other elements or steps, and the indefinite article "a" or "an" does not exclude a plurality.

What is claimed is:

1. A method for producing a frame of a merged digital video sequence, comprising:
    obtaining, using an image processor, a first digital video sequence;
    analyzing, using an analysis unit, frames of the first digital video sequence to identify pixel blocks considered to be of relevance;
    producing, using a mask generator, a mask indicating pixel blocks of the frames of the first digital video sequence being of relevance;
    encoding, using an encoding unit using a video compression algorithm, a frame of the first digital video sequence using the mask into a frame in an encoded version of the first video sequence, wherein the pixel blocks being masked out as not being of relevance are encoded using skip blocks;
    transmitting the encoded version of the first video sequence over a network to a client;
    obtaining, using the image processor, a second digital video sequence, wherein the first and second digital video sequences both include at least one block of pixels that depicts approximately the same area of relevance and are not encoded as skip blocks, wherein the frames of the first digital video sequence have a higher number of pixels than the frames of the second digital video sequence;
    transmitting the second digital video sequence over the network to the client;
    scaling, using a scaler of the client, a frame of the second digital video sequence such that an up-scaled frame of the second digital video sequence having the same number of pixels as the frame of the first video sequence is obtained;
    identifying, at the client, while decoding the encoded frame of the first digital video sequence and using a skip block identifier, a position for at least one skip block and a position for at least one non-skip block in the frame of the first digital video sequence;
    extracting, using a block extractor of the client and based on the identified position for the at least one skip block in the frame of the first digital video sequence, at least one corresponding block of pixels from the up-scaled frame of the second digital video sequence;
    extracting, using the block extractor and based on the identified position for the at least one non-skip block in the frame of the first digital video sequence, at least one corresponding block of pixels from the frame of the first digital video sequence; and
    merging, using a merging unit of the client, the extracted block of pixels from the frame of the second digital video sequence and the extracted block of pixels from the frame of the first digital video sequence such that the frame of the merged video sequence is produced, wherein the pixels of the extracted block of pixels from the frame of the first digital video sequence are generated independently of the pixels of the extracted block of pixels from the frame of the second digital video sequence.

2. The method according to claim 1, further comprising filtering, using a filter, the scaled frame of the second digital video sequence.

3. The method according to claim 1, wherein the frames of the second digital video sequence is encoded using a video compression algorithm, wherein the method further comprises decoding, using the decoder, a frame of the second digital video sequence.

4. The method according to claim 1, wherein the encoded frame of the first digital video sequence is an INTER-frame.

5. The method according to claim 1, wherein the video compression algorithm is ITU-H.26X, ISO-MPEG, WMV, On2 or WebM compliant.

6. The method according to claim 1, further comprising storing the frame of the merged video sequence in a memory.

7. The method according to claim 1, further comprising play back of the frame of the merged video sequence.

8. A non-transitory computer-readable recording medium having recorded thereon a program for implementing the method according to claim 1 when executed on a device having processing capabilities.

9. A video processing device arranged to execute the program recorded on the non-transitory computer-readable recording medium according to claim 8.

10. A system for producing a frame of a merged digital video sequence, the system comprising:
    a digital video camera arranged to obtain a first digital video sequence;
    an analysis unit, of the digital video camera, the analysis unit arranged to analyze frames of the first digital video sequence to identify pixel blocks considered to be of relevance;
    a mask generator, of the analysis unit, the mask generator arranged to output a mask indicating pixel blocks of relevance in the frames of the first digital video sequence;

an encoding unit, of the digital video camera, the encoding unit arranged to encode a frame of the first digital video sequence using the mask indicating pixel blocks of relevance into a frame in an encoded version of the first video sequence, wherein the pixel blocks being masked out as not being of relevance are encoded using skip blocks;

the digital video camera is further arranged to transmit the encoded version of the first video sequence over a network to a client, the digital video camera is further arranged to obtain a second digital video sequence, wherein the first and second digital video sequences both include at least one block of pixels that depicts approximately the same area of relevance and are not encoded as skip blocks wherein the frames of the first digital video sequence have a higher number of pixels than the second digital video sequence, the digital video camera being further arranged to transmit the second digital video sequence over the network to the client, the system further comprises a scaler at the client arranged to scale a frame of the second digital video sequence such that an up-scaled frame of the second digital video sequence is obtained, the up-scaled frame of the second digital video sequence having the same number of pixels as the frame of the first video sequence;

the system further comprises a decoder at the client arranged to decode the encoded frame of the first digital video sequence;

the system further comprises a skip block identifier arranged to, at the client, while decoding, using the decoder, the encoded frame of the first digital video sequence, identify a position for at least one skip block and a position for at least one non-skip block in the frame of the first digital video sequence;

the system further comprises a block extractor at the client arranged to extract based on the identified position for the at least one skip block in the frame of the first digital video sequence, at least one corresponding block of pixels from the up-scaled frame of the second digital video sequence and based on the identified position for the at least one non-skip block in the frame of the first digital video sequence, at least one corresponding block of pixels from the frame of the first digital video sequence; and a merging unit at the client arranged to merge the extracted block of pixels from the frame of the second digital video sequence and the extracted block of pixels from the frame of the first digital video sequence such that the frame of the merged video sequence is produced, wherein the pixels of the extracted block of pixels from the frame of the first digital video sequence are generated independently of the pixels of the extracted block of pixels from the frame of the second digital video sequence.

11. The system according to claim 10, further comprising an image sensor arranged to capture a video sequence of a scene; and wherein the digital video camera is arranged to process the video sequence of the scene captured by the image sensor into the first and the second digital video sequence depicting the same scene.

12. A method for producing a frame of a merged digital video sequence, comprising:

obtaining a first digital video sequence using an image processor;

obtaining a second digital video sequence using the image processor, wherein frames of the first digital video sequence have a higher number of pixels than the frames of the second digital video sequence;

identifying relevant pixel blocks in the frames of the first digital video sequence using an analysis unit, wherein the second digital video sequence includes at least one pixel block that is not encoded as a skip block and that depicts approximately the same area of relevance as that depicted in at least one relevant pixel block identified in the frames of the first digital video sequence;

generating a mask based on the identified relevant pixel blocks of the frames of the first digital video sequence;

encoding a frame of the first digital video sequence using the mask into a frame in an encoded version of the first video sequence using an encoder, wherein non-relevant pixel blocks being masked out are encoded using skip blocks;

transmitting the encoded version of the first video sequence and the second digital video sequence to a client;

up-scaling a frame of the second digital video sequence using a scaler at the client, wherein an up-scaled frame has a same number of pixels as the frame of the first digital video sequence;

identifying, at the client, a position for at least one skip block and a position for at least one non-skip block in the frame of the first digital video sequence while decoding the encoded frame of the first digital video sequence and using a skip block identifier;

extracting at least one corresponding block of pixels from the up-scaled frame of the second digital video sequence using a block extractor at the client and based on the identified position for the at least one skip block in the frame of the first digital video sequence;

extracting at least one corresponding block of pixels from the frame of the first digital video sequence using the block extractor and based on the identified position for the at least one non-skip block in the frame of the first digital video sequence; and merging the extracted block of pixels from the frame of the second digital video sequence and the extracted block of pixels from the frame of the first digital video sequence using a merging unit at the client to produce the frame of the merged video sequence, wherein the pixels of the extracted block of pixels from the frame of the first digital video sequence are generated independently of the pixels of the extracted block of pixels from the frame of the second digital video sequence.

13. The method according to claim 12, further comprising:

filtering the up-scaled frame of the second digital video sequence using a filter.

14. The method according to claim 12, wherein the frames of the second digital video sequence are encoded, further comprising:

decoding a frame of the second digital video sequence using the decoder.

15. The method according to claim 12, wherein the encoded frame of the first digital video sequence is an INTER-frame.

16. The method according to claim 12, wherein a video compression algorithm used in the encoder is at least one of ITU-H.26X, ISO-MPEG, WMV, On2 or WebM compliant.

17. The method according to claim 12, further comprising:
   storing the frame of the merged video sequence in a memory.

18. The method according to claim 12, further comprising:
   playing back of the frame of the merged video sequence.

\* \* \* \* \*